United States Patent
Udo (10) Patent No.: US 10,001,368 B2
(45) Date of Patent: Jun. 19, 2018

(54) IMAGE MEASUREMENT APPARATUS, IMAGE MEASUREMENT METHOD, INFORMATION PROCESSING APPARATUS, INFORMATION PROCESSING METHOD, AND PROGRAM

(71) Applicant: Mitutoyo Corporation, Kawasaki-shi, Kanagawa (JP)

(72) Inventor: Shohei Udo, Miyazaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 315 days.

(21) Appl. No.: 15/096,623

(22) Filed: Apr. 12, 2016

(65) Prior Publication Data

US 2016/0307311 A1  Oct. 20, 2016

(30) Foreign Application Priority Data

Apr. 14, 2015  (JP) ................. 2015-082239

(51) Int. Cl.
  *G01B 21/04* (2006.01)
  *G01B 11/24* (2006.01)
  *G01B 11/00* (2006.01)

(52) U.S. Cl.
  CPC ............ *G01B 11/24* (2013.01); *G01B 11/005* (2013.01); *G01B 21/045* (2013.01)

(58) Field of Classification Search
  None
  See application file for complete search history.

(56) References Cited

U.S. PATENT DOCUMENTS

| 7,085,673 B2 * | 8/2006 | Picciotto | G06T 7/20 |
| | | | 382/294 |
| 2007/0028677 A1 * | 2/2007 | McFarland | G01B 21/045 |
| | | | 73/105 |

FOREIGN PATENT DOCUMENTS

JP  2014-228529  12/2014

* cited by examiner

*Primary Examiner* — Jay Patel
*Assistant Examiner* — Shadan E Haghani
(74) *Attorney, Agent, or Firm* — Rankin, Hill & Clark LLP (57) ABSTRACT

Provided is an object image measurement apparatus including an image capturing part that image-captures an object; a movement mechanism that changes an image capturing position of the image capturing part to the object; and a calculation part that calculates a correction value from a first captured image group acquired by placing the image capturing part static at each of a plurality of image capturing positions and a second captured image group acquired by relatively moving the image capturing part so as to pass each of a plurality of the image capturing positions. The first captured image group and the second captured image group are captured image groups of images captured at a plurality of the predetermined image capturing positions by the image capturing part.

8 Claims, 9 Drawing Sheets

FIG.9

IMAGE MEASUREMENT APPARATUS, IMAGE MEASUREMENT METHOD, INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2015-082239 filed Apr. 14, 2015 and Japanese Priority Patent Application JP filed, the entire contents of which are incorporated herein by reference.

BACKGROUND

The present invention relates to an image measurement apparatus, an image measurement method, an information processing apparatus, an information processing method, and a program.

In the related art, an image measurement apparatus that can measure a shape etc. from an image captured of an object to be measured is known. For example, Japanese Patent Application Laid-open No. 2014-228529 (hereinafter, referred to as "Patent Document 1") discloses a shape measurement apparatus including a shape measurement device having an image capturing unit that image-captures a stage and a work on the stage, and a computer that measures a shape of the work from the captured image by the image capturing unit (see paragraph [0009] etc. in specification of Patent Document 1).

In the shape measurement apparatus, vibration of the shape measurement device is detected during the shape of the work is measured while the image capturing unit is moved. A moving amount of the image capturing unit is controlled such that the vibration detected is canceled. In this manner, deviation by the vibration of the image capturing unit to the stage is inhibited, and a measurement accuracy is improved (see paragraph [00019] etc. in specification of Patent Document 1).

SUMMARY

As described above, in the image measurement apparatus that measures a shape, etc. from the image captured by the image capturing unit, it needs to provide a technology that improve measurement accuracy.

In view of the circumstances as described above, the present invention aims at providing an image measurement apparatus, an image measurement method, an information processing apparatus, an information processing method, and a program capable of measuring an object to be measured with high accuracy.

To attain the object described above, according to an embodiment of the present invention, there is provided an image measurement apparatus includes an image capturing part, a movement mechanism and a calculation part.

The image capturing part can image-capture an object.

The movement mechanism can change an image capturing position of the image capturing part to the object.

The calculation part can calculate a correction value from a first captured image group acquired by placing the image capturing part static at each of a plurality of image capturing positions and a second captured image group acquired by relatively moving the image capturing part so as to pass each of a plurality of the image capturing positions. The first captured image group and the second captured image group are captured image groups of images captured at a plurality of the predetermined image capturing positions by the image capturing part.

In the image measurement apparatus, a correction value is calculated from the first captured image group acquired by image-capturing the object with an image capturing part placed static at each of a plurality of image capturing positions, and second captured image group acquired by image-capturing the object with the image capturing part relatively moving. By using the correction value, it becomes possible to measure the object to be measured with high accuracy while the image capturing unit is moved.

The object may be an object to be measured. In this case, the image measurement apparatus may further comprise a correction part that corrects a measurement result based on the second captured image group from the correction value calculated.

In this way, it is possible to measure the object to be measured with high accuracy.

The image measurement apparatus may further comprise a memory part that stores the correction value calculated.

In this case, the correction part may correct the measurement result from the correction value stored.

In this way, it is possible to measure the object to be measured with high accuracy.

According to an embodiment of the present invention, there is provided an image measurement method includes acquiring a first captured image group by image-capturing an object with an image capturing part placed static at each of a plurality of image capturing positions.

A second captured image group is acquired by image-capturing the object with the image capturing part relatively moving so as to pass each of a plurality of the image capturing positions.

From the first and second captured image groups acquired, a correction value is calculated.

By using the correction value calculated, it becomes possible to measure the object to be measured with high accuracy while the image capturing unit is moved.

Acquiring the first captured image group may be executed to the object to be measured. In this case, acquiring the second captured image group may be executed to each of the object to be measured and a plurality of other objects to be measured in the same type. The image measurement method may include correcting a measurement result of each of a plurality of the other objects to be measured based on the second captured image group from the correction value calculated to the object to be measured.

In this manner, it is possible to measure effectively other objects to be measured in the same type.

According to an embodiment of the present invention, there is provided an information processing apparatus includes a movement control part and a calculation part.

The movement control part can control an image capturing position of an image capturing part that image captures an object According to an embodiment of the present invention, there is provided an information processing method executed by a computer including acquiring a first captured image group by image-capturing an object with an image capturing part placed static at each of a plurality of image capturing positions.

A second captured image group is acquired by image-capturing the object with the image capturing part relatively moving so as to pass each of a plurality of the image capturing positions.

From the first and second captured image groups acquired, a correction value is calculated.

A program according to an embodiment of the present invention causes a computer to execute the information processing method As described above, according to the present invention, it becomes possible to measure the object to be measured with high accuracy. It should be noted that the effects described herein are not necessarily limited, and any of the effects described in the present disclosure may be obtained.

These and other objects, features and advantages of the present invention will become more apparent in light of the following detailed description of best mode embodiments thereof, as illustrated in the accompanying drawings.

DETAILED DESCRIPTION OF EMBODIMENTS

Hereinafter, an embodiment of the present invention will be described with reference to the drawings.
[Configuration of Image Measurement Apparatus]

Figure 1:
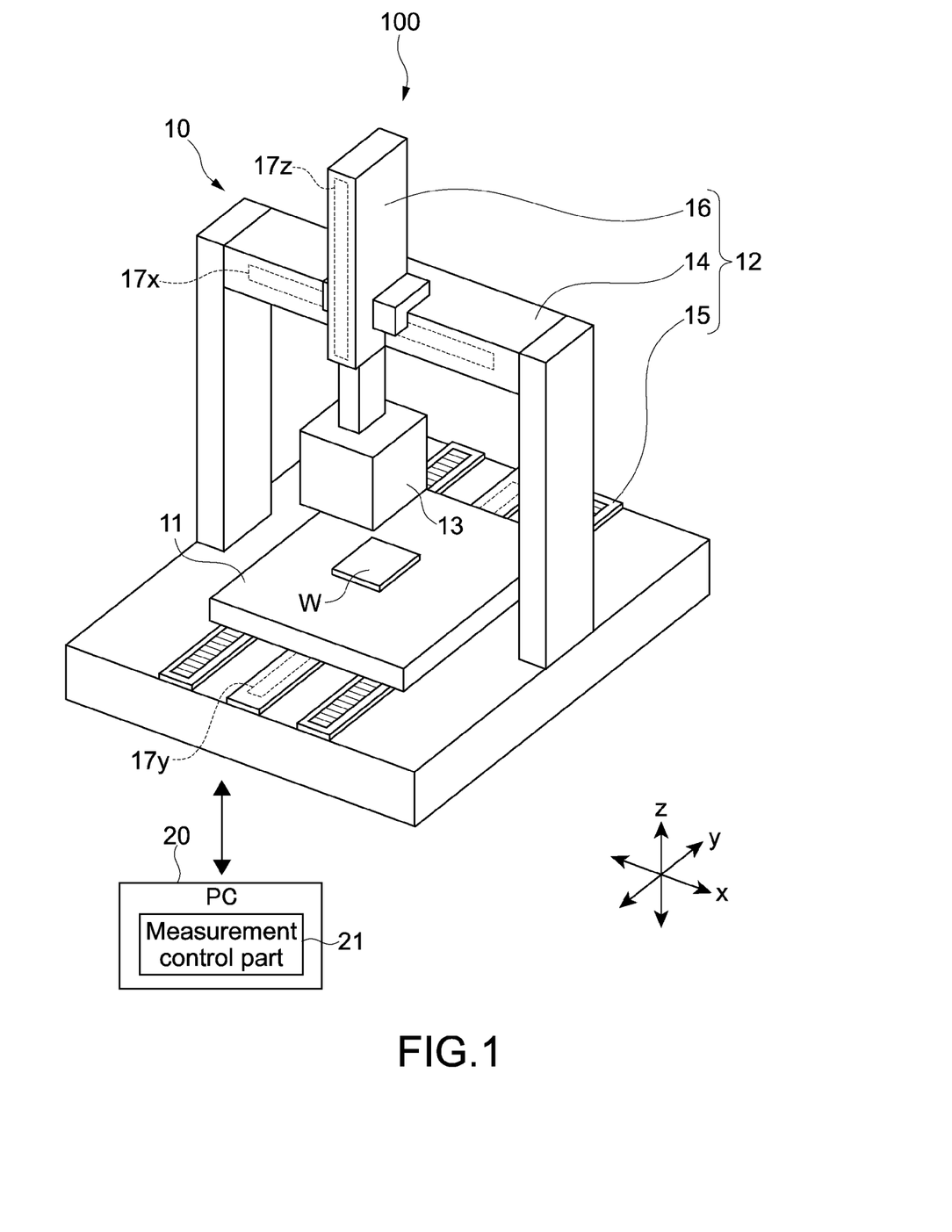
FIG. 1 is a schematic diagram of an image measurement apparatus according an embodiment of the present invention.

FIG. 1 is a schematic diagram of an image measurement apparatus according an embodiment of the present invention. The image measurement apparatus 100 has a non-contact type image measurement device 10 and a PC (Personal Computer) 20 as an information processing apparatus. In the information processing apparatus according to the present technology, other computers may be used.

The image measurement device 10 includes a stage 11, a movement mechanism 12, and an image capturing unit (image capturing part) 13. At a predetermined position of the stage 11, a work W that is an object to be measured is placed. The work W is also applied to an object image-captured by the image capturing unit 13.

The movement mechanism 12 can change an image capturing position of the image capturing unit 13 to the work W in three-dimensional directions, xyz. The image capturing position is a relative position of the image capturing unit 13 to the work W when an image is captured. Accordingly, by relatively moving the image capturing unit 13 and the work W, it is possible to change the image capturing position.

As shown in FIG. 1, the movement mechanism 12 includes an x movement mechanism 14, a y movement mechanism 15, and a z movement mechanism 16. The z movement mechanism 16 moves the image capturing unit 13 along a z direction. The x movement mechanism 14 moves the image capturing unit 13 and the z movement mechanism 16 integrally along an x direction. The y movement mechanism 15 moves the stage 11 along a y direction. A specific configuration of each movement mechanism is not limited, and may be designed freely.

At each of the xyz movement mechanisms, an axis displacement sensor 17, for example, a linear scale etc. is placed. From detection values of an axis displacement sensor 17x and a z axis displacement sensor 17z, x and z coordinates of the image capturing unit 13 are calculated. In addition, from a detection value of a y axis displacement sensor 17y, a y coordinate of the stage 11 is calculated.

On the image capturing unit 13, a digital camera (including a video camera) having an objective lens 18 (see FIG. 3A) and an image-capturing device (not shown) is mounted. Light reflected by the work W is incident on the image-capturing device via an objective lens 18, thereby generating a digital image of the work W. As the image-capturing device, a CMOS (Complementary Metal-Oxide Semiconductor) sensor, a CCD (Charge Coupled Device) sensor or the like is used, for example.

The PC 20 is connected to the image measurement device 10 by any connection form. The PC 20 has hardware necessary for the configuration of the computer such as a CPU (Central Processing Unit), a ROM (Read Only Memory), a RAM (Random Access Memory), a HDD (Hard Disk Drive) (all are not shown) or the like.

In the ROM and HDD, programs executed by the CPU and a variety of data such as a shape data are stored. Also, the RAM is used as a temporary work area by the CPU and an area for temporary saving data.

Information processing by the PC 20 is realized by a cooperation of software stored in the ROM or the like and hardware resources in the PC 20. In this embodiment, as shown in FIG. 1, by executing a predetermined program by the CPU, a measurement control part 21 is configured as a functional block. Note that dedicated hardware may be used to constitute the measurement control part 21.

The program is installed to the PC 20 via a variety of recording media, for example. Alternatively, the program may be installed on the PC 20 via the Internet, or the like.

Figure 2:
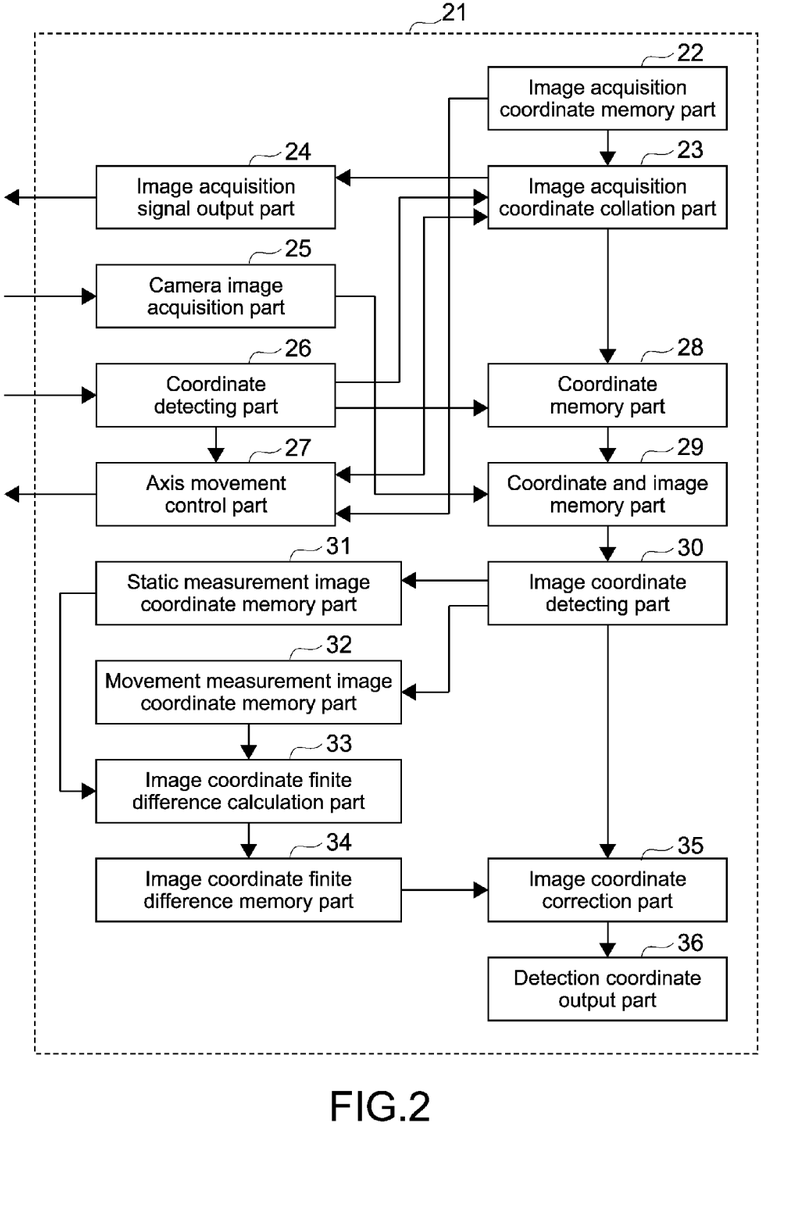
FIG. 2 is a functional block diagram showing a configuration example of a measurement control part shown in FIG. 1.

FIG. 2 is a functional block diagram showing a configuration example of the measurement control part 21. The measurement control part 21 includes an image acquisition coordinate memory part 22, an image acquisition coordinate collation part 23, an image acquisition signal output part 24, a camera image acquisition part 25, a coordinate detecting part 26, and an axis movement control part 27. Also, the measurement control part 21 includes a coordinate memory part 28, a coordinate and image memory part 29, an image coordinate detecting part 30, a static measurement image coordinate memory part 31, a movement measurement image coordinate memory part 32, an image coordinate finite difference calculation part 33, and an image coordinate finite difference memory part 34. Furthermore, the measurement control part 21 includes an image coordinate correction part 35, and a detection coordinate output part 36.

The image acquisition coordinate memory part 22 stores a coordinate value at an image capturing position (hereinafter referred to as "image capturing position coordinate"). In this embodiment, as the image capturing position coordinate, x and z coordinates of the image capturing unit 13 where an image is captured, and a y coordinate of the stage 11 are stored in advance.

The coordinate detecting part 26 detects a coordinate at a current measurement position (hereinafter referred to as "measurement position coordinate") from the detection value by each of the xyz axis displacement sensors 17. The measurement position coordinate includes x and z coordinates of the image capturing unit 13 at current and a y coordinate of the stage 11 at current.

The image acquisition coordinate collation part 23 is collated with the measurement position coordinate detected by the coordinate detecting part 26, and an image capturing position coordinate stored on the image acquisition coordinate memory part 22. When both coordinates are matched, the image acquisition coordinate collation part 23 instructs an output of an image acquisition signal to the image acquisition signal output part 24.

The image acquisition signal output part 24 outputs the image acquisition signal to a digital camera of the image capturing unit 13. By outputting the signal, an image is captured by the image capturing unit 13. The camera image acquisition part 25 acquires an image captured by the image capturing unit 13.

The axis movement control part 27 controls the movement mechanism 12, and moves the image capturing unit 13 and the stage 11. The coordinate memory part 28 stores the measurement position coordinate, when the measurement position coordinate detected by the coordinate detecting part 26 is matched with the image capturing position coordinate.

The coordinate and image memory part 29 stores the image captured by the image capturing unit 13, and the measurement position coordinate when the image is captured (i.e., the image capturing position coordinate).

The image coordinate detecting part 30 detects a coordinate about an external shape and a feature point of the work W in three-dimensional directions xyz (hereinafter referred to as "measurement coordinate"), from the captured image and the measurement position coordinate stored in the coordinate and image memory part 29. For example, using the known image analysis technology such as an edge detection, from the position on the captured image and the measurement position coordinate, the measurement position coordinate in respective points of the work W may be detected.

The image coordinate correction part 35 corrects the measurement coordinate detected by the image coordinate detecting part 30. The details will be described later. In this embodiment, the image is captured by relatively moving the image capturing unit 13 so as to pass each of a plurality of the capturing positions. From a group of the captured images, the measurement coordinate of the work W is detected. The image coordinate correction part 35 corrects the measurement coordinate detected.

The detection coordinate output part 36 outputs the measurement coordinate corrected by the image coordinate correction part 35.

The static measurement image coordinate memory part 31, the movement measurement image coordinate memory part 32, the image coordinate finite difference calculation part 33 and the image coordinate finite difference memory part 34 are blocks for calculating the correction value used for the correction by the image coordinate correction part 35. The details about each block will be described in detail.

[Operation of Image Measurement Apparatus]

As described above, in the image measurement apparatus 100 according to this embodiment, the measurement is possible by relatively moving the image capturing unit 13 so as to pass a plurality of the capturing positions without stopping the image capturing unit 13. For example, the image capturing position is automatically changed (the image capturing unit 13 is relatively moved) along a predetermined route based on a part program stored on a ROM. Just at that time, if the measurement position coordinate is matched with the image capturing position coordinate, the image is automatically captured. Hereinafter, the measurement is referred to as "movement measurement".

Figure 3A:
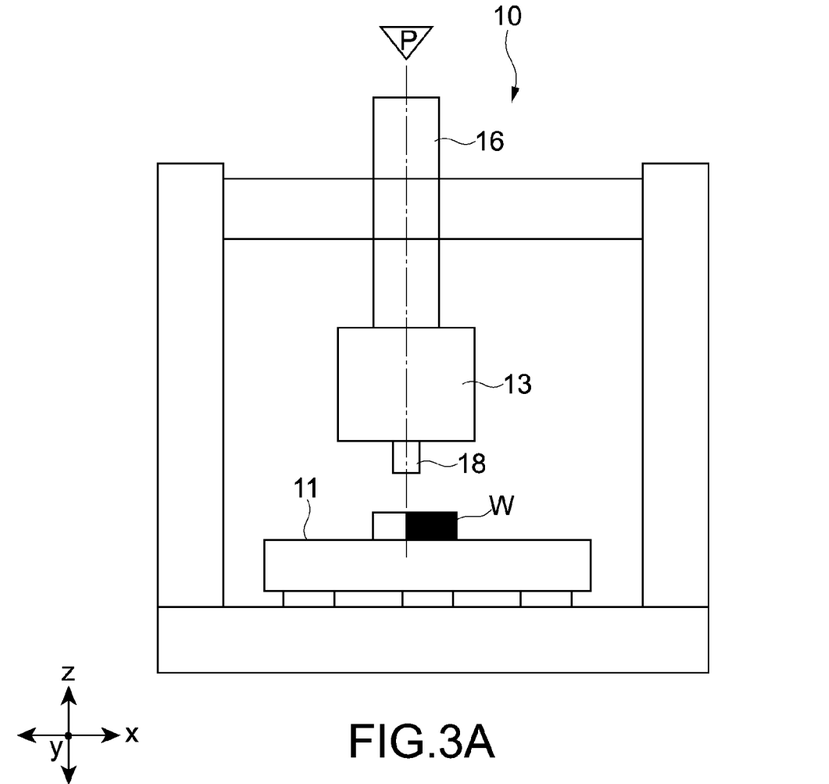
FIGS. 3A and 3B each is a diagram showing that an image is captured in a state that an image capturing unit is static at an image capturing position.
Figure 3B:
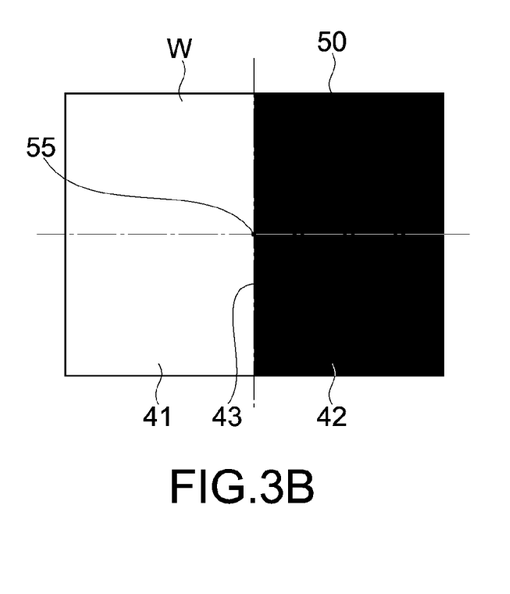
Figure 4A:
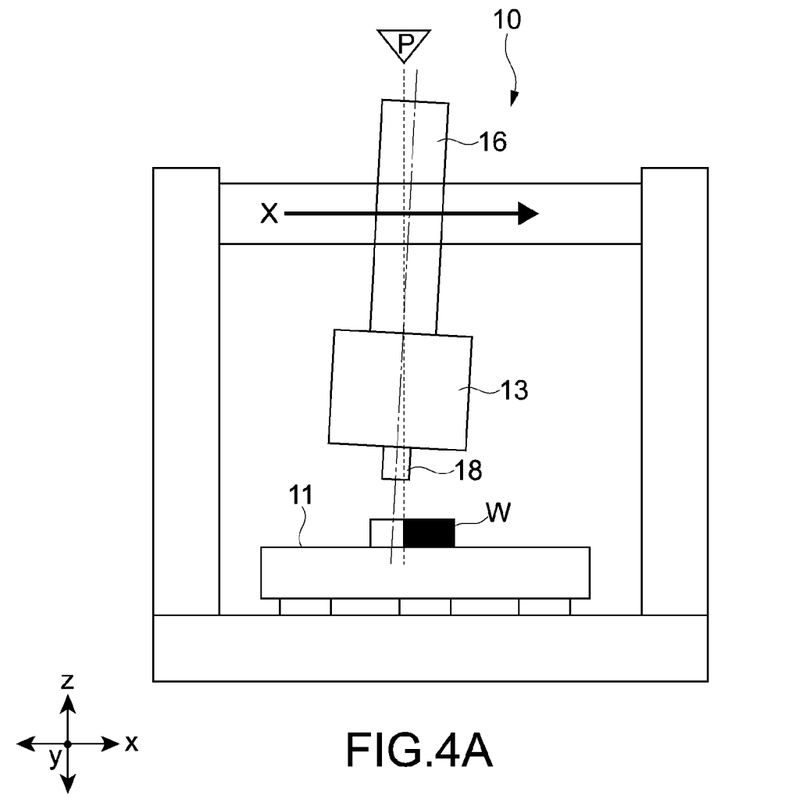
FIGS. 4A and 4B each is a diagram showing that an image is captured in a state that an image capturing unit is accelerated at an image capturing position.
Figure 4B:
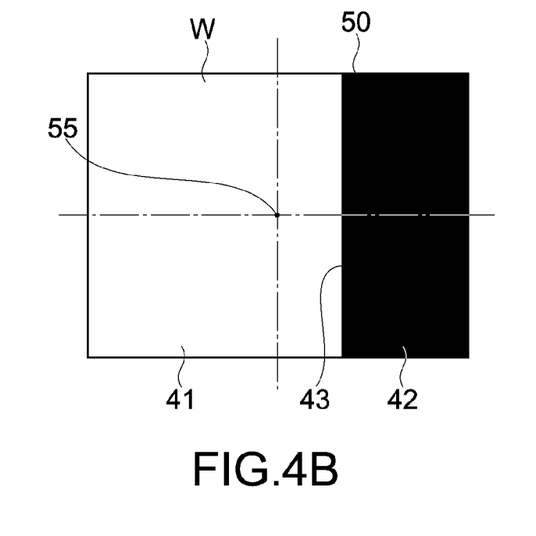
Figure 5A:
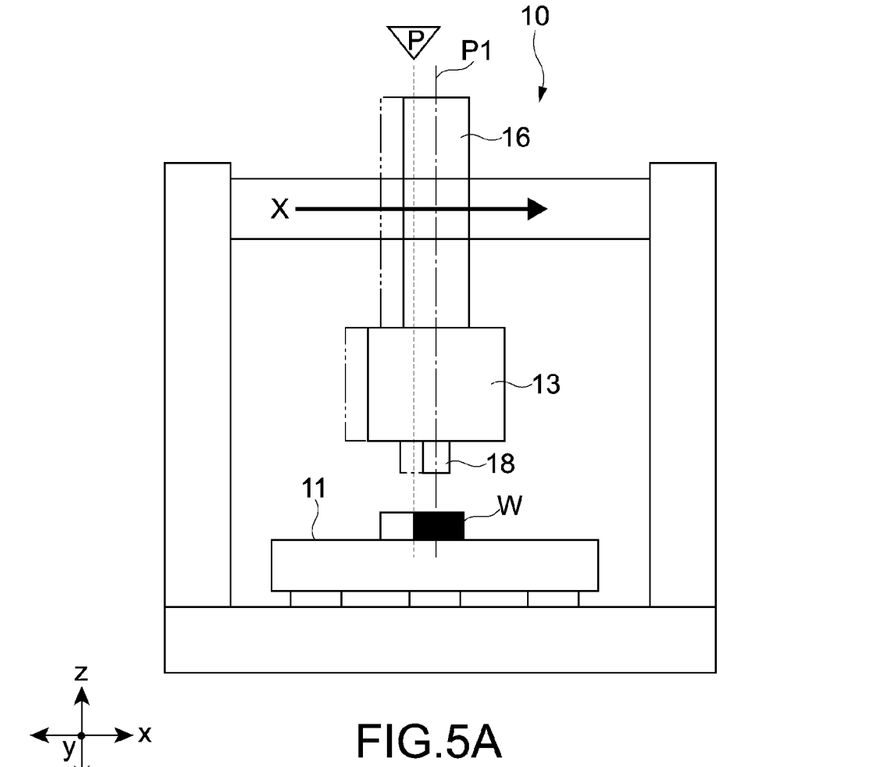
FIGS. 5A and 5B each is a diagram for illustrating a timing of an image acquisition during the movement.

FIGS. 3A, 3B, 4A, 4B, 5A and 5B are diagrams for illustrating possible problems occurred at the movement measurement. FIGS. 3A, 4A and 5A each is a front diagram of the image measurement device 10 viewed from a y direction, and FIGS. 3B, 4B and 5B each is an image captured by the image capturing unit 13.

FIGS. 3A and 3B each is a diagram showing that an image is captured in a state that the image capturing unit 13 is static at an image capturing position P. In this case, the image capturing unit 13 and the stage 11 are moved on the capturing position coordinate, the work W directly below is image-captured. Here, as the work W, a plate-like member having a white area 41 and a black area 42 is used. Then, as shown in FIG. 3B, the image capturing position P is set so as to overlap a boundary 43 between the white area 41 and the black area 42 with a center point 55 of the captured image 50.

FIGS. 4A and 4B each is a diagram showing that an image is captured in a state that the image capturing unit 13 is accelerated at the image capturing position P. In this case, as acceleration acts on the image capturing unit 13 and the z movement mechanism 16, tilt or distortion may occur by inertia by these weights, as shown in FIG. 4A. If the stage 11 is accelerated, the work W may be distorted.

As shown in FIG. 4B, in the captured image 50 captured by the image capturing unit 13, the boundary 43 of the work W is undesirably deviated from the center point 55 of the captured image 50. If the measurement coordinate is calculated from the captured image 50, the deviation of the image forms an error just as much as the deviation of the image as compared with the measurement coordinate calculated from the captured image 50 at the static measurement shown in FIG. 3B. The deviation of the captured image 50 may be generated during deceleration or a centrifugal force by a simultaneous arc movement between two or more axes.

Figure 5B:
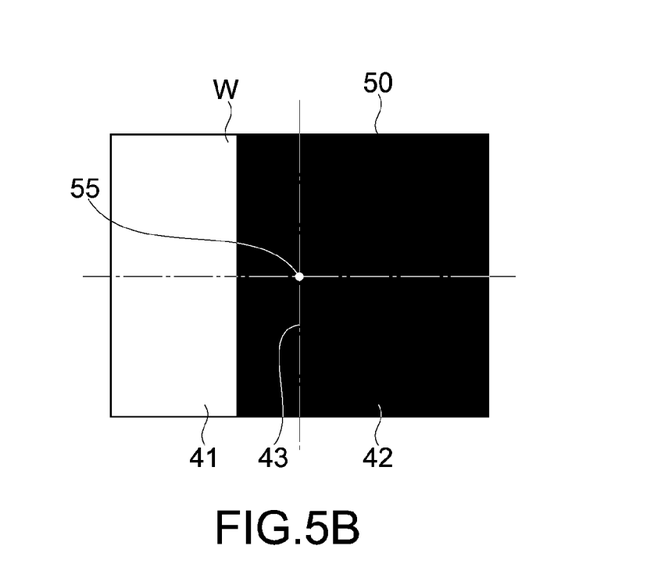

FIGS. 5A and 5B each is a diagram for illustrating a timing of an image acquisition during the movement. The measurement position coordinate is collated with the capturing position coordinate by the image acquisition coordinate collation part 23 shown in FIG. 2. A few time is necessary until the image acquisition signal is output from the image acquisition signal output part 24 to the image capturing unit 13 in response to the matching the both coordinates. In fact, the image is captured by the image capturing unit 13 delayed from the timing when the image capturing unit 13 is moved to the image capturing position P (a delay image capturing position P1 in FIG. 5A).

If the timing of the image acquisition is delayed, the boundary 43 of the work W is undesirably deviated from the center point 55 of the captured image 50 in the captured image 50 as shown in FIG. 5B. If the measurement coordinate is calculated from the captured image 50, the deviation of the image forms an error just as much as the deviation of the image.

Then, the present inventor focused on the following: If the movement measurement is executed according to a predetermined route by the same part program, for example, the distortion of the movement mechanism 12 and the work W and the deviation of the timing of the image acquisition caused by the acceleration, the deceleration, the centrifugal force or the like at each image capturing position P are generated under the almost same conditions each time. In other words, a deviation amount in the captured image 50 at each image capturing position is almost same each time.

The image capturing unit 13 is static at each of a plurality of the image capturing positions P to measure an image (hereinafter referred to as "static measurement"). The measurement result (i.e., a measurement coordinate detected by each captured image 50) is acquired. It is invented that a finite difference between the measurement result by the static measurement and the measurement result by the movement measurement is calculated as a correction value. Specific operation examples will be described below.

Figure 6:
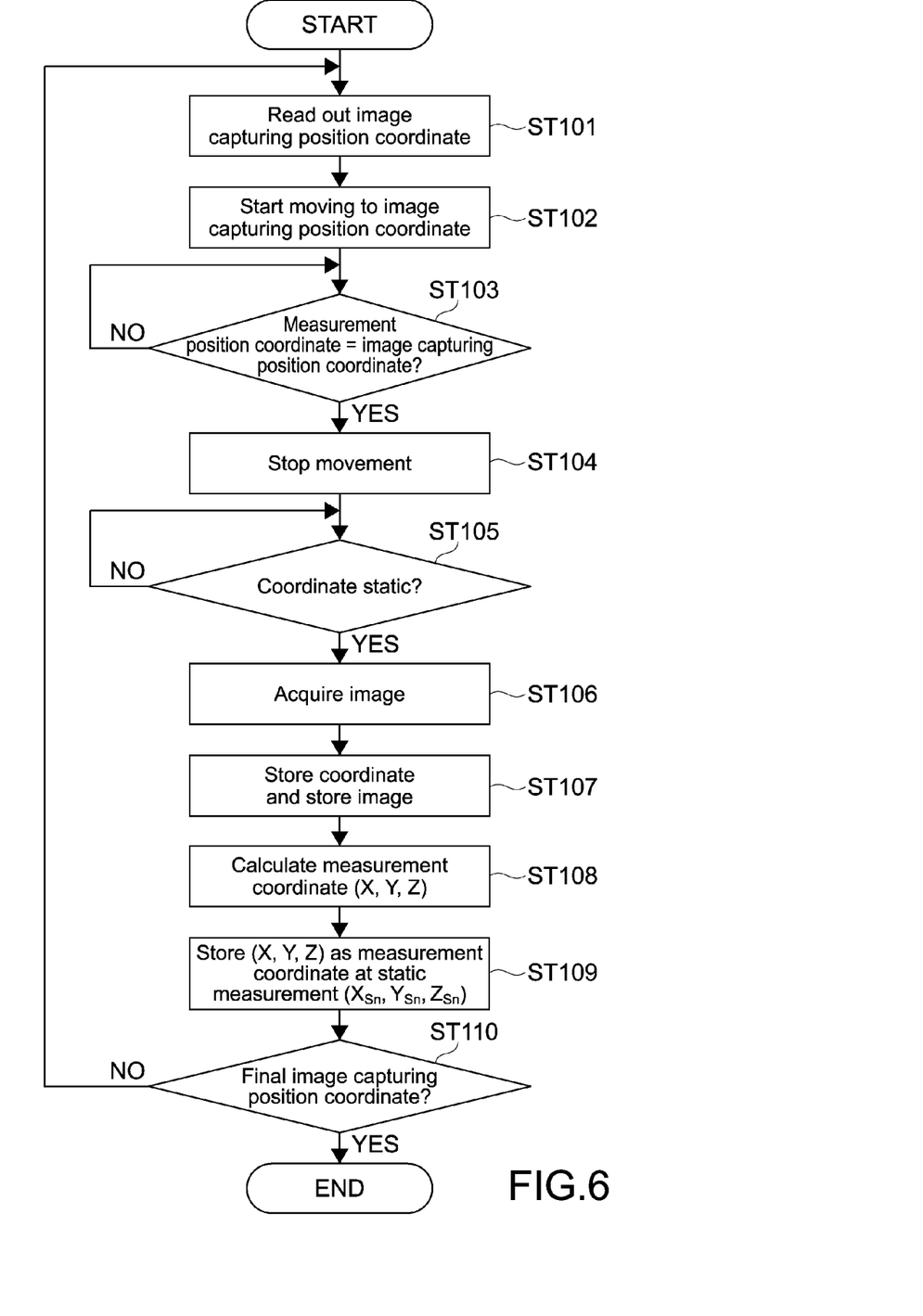
FIG. 6 is a flow chart showing an operation example of a static measurement.

FIG. 6 is a flow chart showing an operation example of the static measurement. The image capturing position coordinate stored on the image acquisition coordinate memory part 22 is read out (Step 101). The axis movement control part 27 moves the image capturing unit 13 and the stage 11 to the image capturing position coordinate read out (Step 102). The image acquisition coordinate collation part 23 determines whether or not the measurement position coordinate is matched with the image capturing position coordinate (Step 103). If the coordinates are matched (Yes in Step 103), a stop of the movement is designated to the axis movement control part 27 (Step 104).

The axis movement control part 27 determines whether or not the state is static (Step 105). If it is identified that the state is static (Yes), a signal showing the identification to the image acquisition coordinate collation part 23. The image acquisition coordinate collation part 23 receives the signal, and designates an output of an image acquisition signal to the image acquisition signal output part 24. In this manner, the work W is image-captured by the image capturing unit 13 to acquire the captured image (Step 106).

Once the captured image is acquired, the coordinate and image memory part 29 stores the captured image and the measurement position coordinate (image capturing position coordinate) associated with each other (Step 107). The image coordinate detecting part 30 detects a measurement coordinate (X, Y, Z) in each point of the work W from the captured image and the measurement position coordinate stored (Step 108).

The measurement coordinate (X, Y, Z) detected is stored on the static measurement image coordinate memory part 31 shown in FIG. 2 as the measurement coordinate at the static measurement (Step 109). The processing described above is executed to all of a plurality of the predetermined image capturing positions (Step 110).

The static measurement image coordinate memory part 31 stores the measurement coordinate $(X_{S1}, Y_{S1}, Z_{S1})$-$(X_{Sn}, Y_{Sn}, Z_{Sn})$ in all image capturing positions. The suffix "n" is a sequence number of the image capturing position coordinates.

In the static measurement, a group of the images captured at the respective image capturing positions corresponds to a first captured image group according to this embodiment. Accordingly, the measurement coordinate $(X_{S1}, Y_{S1}, Z_{S1})$-$(X_{Sn}, Y_{Sn}, Z_{Sn})$ in all image capturing positions corresponds to measurement results based on the first captured image group.

Figure 7:
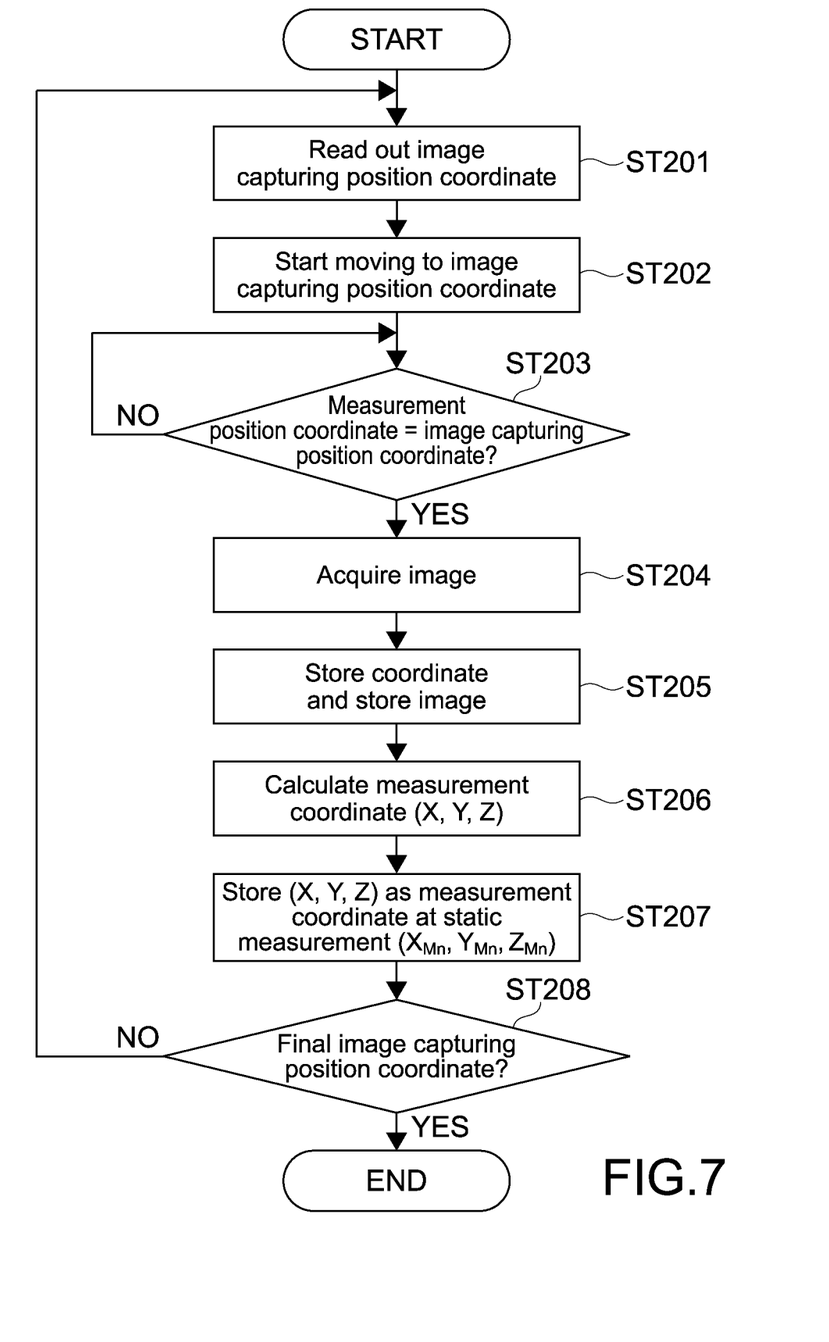
FIG. 7 is a flow chart showing an operation example of a movement measurement.

FIG. 7 is a flow chart showing an operation example of the movement measurement. The movement measurement is executed in a state that the same work W is mounted on the stage 11 without change after the static measurement is executed.

In Steps 201 to 203, the image capturing position coordinate read out is collated with the measurement position coordinate. The image capturing position coordinate read out is same as the image capturing position coordinate at the static measurement.

If the image capturing position coordinate is matched with the measurement position coordinate (YES in Step 203), the image acquisition signal output part 24 outputs the image acquisition signal to the image capturing unit 13 to acquire the captured image (Step 204). The captured image acquired and the measurement position coordinate are stored (Step 205). Based thereon, the measurement coordinate (X, Y, Z) at each point of the work W is detected (Step 206).

The measurement coordinate (X, Y, Z) detected is stored on the movement measurement image coordinate memory part 32 shown in FIG. 2 as the measurement coordinate at the movement (Step 207). The above-described processing is executed to all of a plurality of the image capturing positions (Step 208).

The movement measurement image coordinate memory part 32 store the measurement coordinate $(X_{M1}, Y_{M1}, Z_{M1})$-$(X_{Mn}, Y_{Mn}, Z_{Mn})$ in all image capturing positions. The suffix "n" is a sequence number of the measurement result at the static measurement. In other words, the respective measurement results $(X_{Sn}, Y_{Sn}, Z_{Sn})$ and $(X_{Mn}, Y_{Mn}, Z_{Mn})$ having the same number are measured at the same image capturing position.

In the movement measurement, the group of the images captured at the respective image capturing positions corresponds to a second captured image group according to this embodiment. Accordingly, the measurement coordinate $(X_{M1}, Y_{M1}, Z_{M1})$-$(X_{Mn}, Y_{Mn}, Z_{Mn})$ in all image capturing positions corresponds to the measurement result based on the second captured image group.

Figure 8:
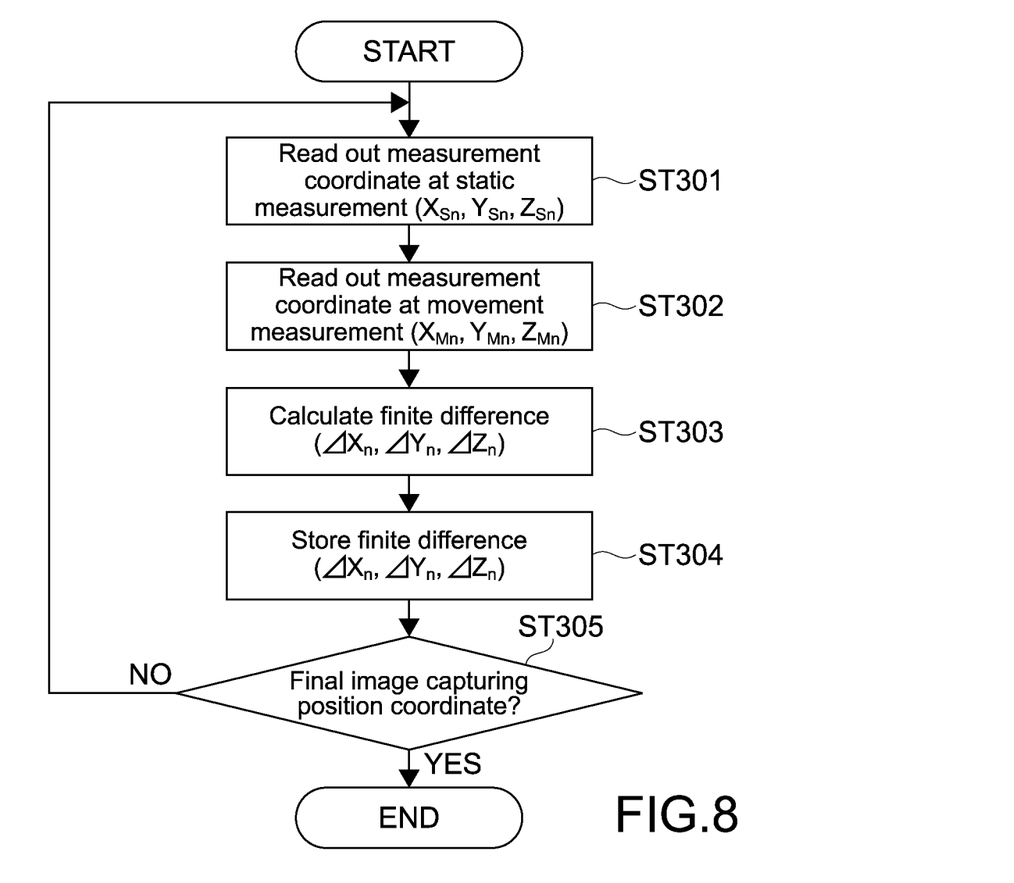
FIG. 8 is a flow chart showing an example of calculating a correction value by an image coordinate difference calculation part.

FIG. 8 is a flow chart showing an example of calculating a correction value executed by the image coordinate finite difference calculation part 33 shown in FIG. 2. From the static measurement image coordinate memory part 31, a measurement coordinate at the static measurement $(X_{Sn}, Y_{Sn}, Z_{Sn})$ is read out (Step 301). From the movement measurement image coordinate memory part 32, a measurement coordinate at the movement measurement $(X_{Mn}, Y_{Mn}, Z_{Mn})$ is read out (Step 302).

By the following equations, a finite difference $(\Delta X_n, \Delta Y_n, \Delta Z_n)$ is calculated (Step 303).

$$\Delta X_n = X_{Mn} - X_{Sn}$$

$$\Delta Y_n = Y_{Mn} - Y_{Sn}$$

$$\Delta Z_n = Z_{Mn} - Z_{Sn}$$

The finite difference $(\Delta X_n, \Delta Y_n, \Delta Z_n)$ calculated is stored in the image coordinate finite difference memory part 34 shown in FIG. 2 (Step 304). The processing is repeated to the final image capturing position coordinate (Step 305). The finite difference $(\Delta X_n, \Delta Y_n, \Delta Z_n)$ corresponds to the correction value calculated from the first captured image group and the second captured image group in this embodiment.

Figure 9:
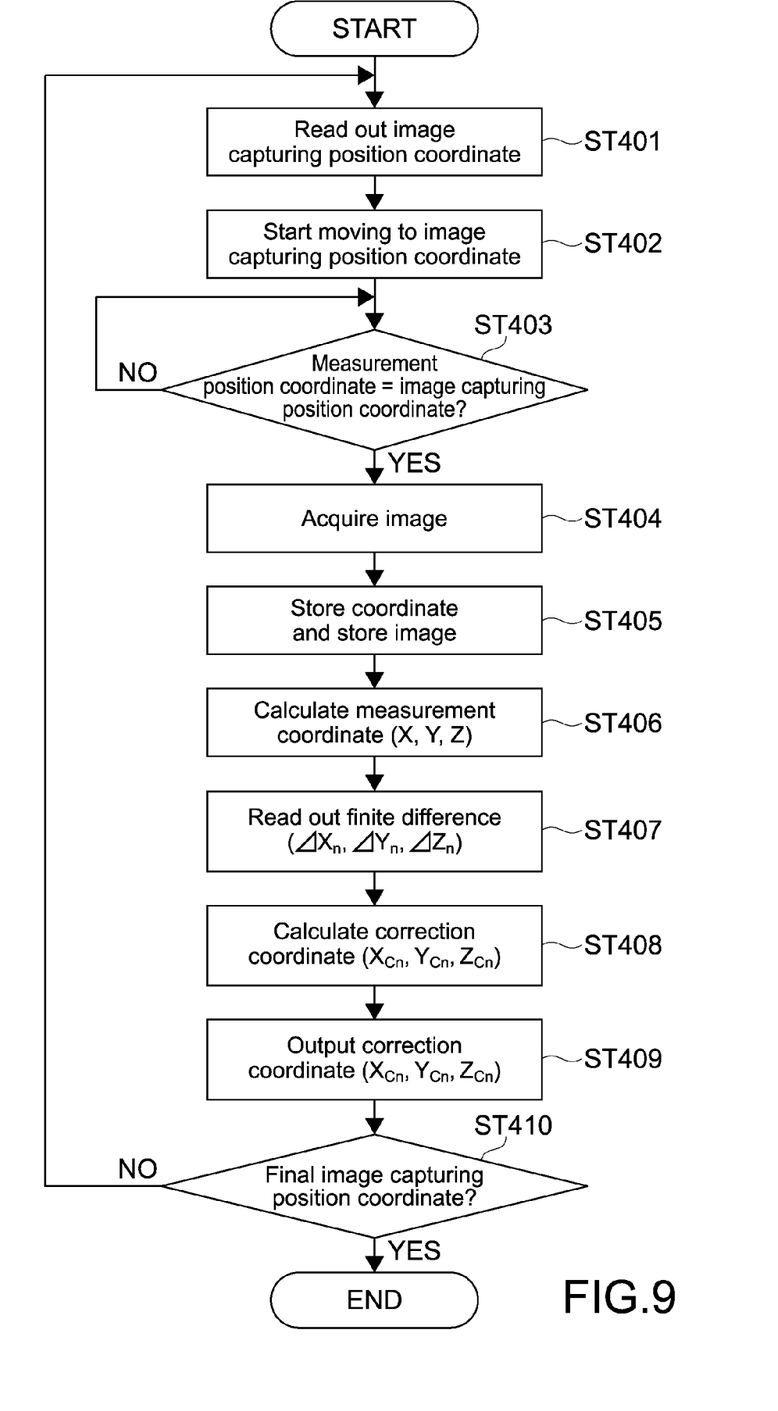
FIG. 9. is a flow chart showing an operation example of a movement measurement using a correction value.

FIG. 9 is a flow chart showing an operation example of the movement measurement using the correction value. On the stage 11, a work W in the same type having the same shape as the work W mounted for calculating the correction value is mounted. From Step 401 to Step 406, the same processing as the movement measurement shown in FIG. 7 is executed.

The measurement coordinate ($X_n$, $Y_n$, $Z_n$) calculated in Step 406 per image capturing position coordinate is output to the image coordinate correction part 35 show in FIG. 2.

The image coordinate correction part 35 reads out a finite difference ($\Delta X_n$, $\Delta Y_n$, $\Delta Z_n$) having the same number n corresponding to the accepted measurement coordinate ($X_n$, $Y_n$, $Z_n$) from the image coordinate finite difference memory part 34 (Step 407). Then, the correction coordinate ($X_{Cn}$, $Y_{Cn}$, $Z_{Cn}$) is calculated by the following equations (Step 408).

$$X_{Cn} = X_n - \Delta X_n$$

$$Y_{Cn} = Y_n - \Delta Y_n$$

$$Z_{Cn} = Z_n - \Delta Z_n$$

The suffix "n" is matched with the number of the measurement results at the static measurement and the movement measurement.

The calculated correction coordinate ($X_{Cn}$, $Y_{Cn}$, $Z_{Cn}$) are output from the detection coordinate output part 36 (409). The above-described processing is repeated to the final image capturing position (Step 410).

According to the image measurement apparatus 100 in this embodiment, the finite difference ($\Delta X_n$, $\Delta Y_n$, $\Delta Z_n$) is calculated from the first captured image group by image-capturing with the image capturing unit 13 placed static at a plurality of the predetermined image capturing positions and the second captured image group by image-capturing by the image capturing unit 13 relatively moved. By using the finite difference ($\Delta X_n$, $\Delta Y_n$, $\Delta Z_n$), the influence of the distortion of the movement mechanism 12 and the work W and the deviation of the timing of the image acquisition caused by the acceleration, the deceleration, the centrifugal force or the like at each image capturing position is eliminated, and the measurement result almost equivalent to that provided at the static can be acquired. That is to say, the work W can be measured with high precision by relatively moving the image capturing unit 13.

Rigidity of a member constituting the movement mechanism 12 etc. may not be increased to the utmost limit in order to prevent the deviation of the image at the movement measurement, thereby reducing the costs.

Any one of a plurality of the works W to be measured is selected as a representative one, and the correction value is calculated from the static measurement and the movement measurement. The correction value is stored. If other work W in the same type is subjected to the movement measurement, the correction is done from the stored correction value. In this manner, a plurality of the works W in the same type can be effectively measured with high precision. By way of example, by using the first one work W, the correction value is easily calculated, thereby executing the movement measurement with high precision without complex processing.

Other Embodiments

The present invention is not limited to the above-described embodiments, and other various embodiments may be made.

In the above description, the work to be measured is used to calculate the correction value. Alternatively, an object for proof is used to calculate the correction value. The object for proof is not limited, but includes a plate-like member described as the work W in FIG. 3A, for example.

If the work to be measured is fixed, if a method of moving the image capturing unit or the stage at the movement measurement is fixed, if a movement mode is simple (moves at an equal speed for one axis, etc.), or if too high precision is not required, the object for proof may be used as the object according to the embodiment.

For example, at the time of factory shipment, the object for proof is used to calculate and store the correction value. Upon the measurement of an actual work, the movement measurement is executed using the correction value. In this manner, the movement measurement with high precision is easily possible. It should be appreciated that it can select to use the correction value calculated using the object for proof or to calculate the correction value using the work on site.

In the above description, the image capturing unit is moved in the x and y directions in order to change the image capturing position of the image capturing unit, and the stage is moved in the y direction. However, it is not limited thereto. The image capturing unit at an image capturing side may be moved in three, i.e., xyz, directions, or the stage at an object to be measured side may be moved in three, i.e., xyz, directions.

Alternatively, those at the image capturing side and the object to be measured side may be moved in the same direction. In any case, the movement for changing the image capturing position of the image capturing unit corresponds to the relative movement of the image capturing unit.

In the above description, the image measurement device and the PC are constituted separately. However, the image measurement device and the PC may be integrally constituted to achieve the image measurement apparatus according to the present invention. That is to say, an information processing unit including a CPU and the like may be provided in the image measurement device, and the information processing unit may constitute measurement control part.

A type of the image measurement apparatus to which the image measurement method according to the present invention is applied is not limited. The present invention is applicable to any apparatus that executes measurement and observation using the object image acquired by image-capturing the work. Examples include a CNC image measurement device, a CNC three-dimensional measurement device and a hardness tester. Also, the present invention is applicable to a digital microscope that image-captures an enlarged image provided by an optical microscope with a digital camera.

Among the features of the respective embodiments described above, it is possible to combine at least two of them. In addition, various effects described above are exemplary only and should not be limited, and other effects may be exerted.

What is claimed is:

1. An image measurement apparatus, comprising:
an image capturing part that image-captures an object;
a movement mechanism that changes an image capturing position of the image capturing part to the object; and
a calculation part that calculates a correction value from a first captured image group acquired by placing the image capturing part static at each of a plurality of image capturing positions and a second captured image group acquired by relatively moving the image capturing part so as to pass each of a plurality of the image capturing positions, the first captured image group and the second captured image group being captured image groups of images captured at a plurality of the predetermined image capturing positions by the image capturing part.

2. The image measurement apparatus according to claim 1, wherein
the object is an object to be measured, and
the image measurement apparatus further comprises a correction part that corrects a measurement result based on the second captured image group from the correction value calculated.

3. The image measurement apparatus according to claim 2, further comprising:
a memory part that stores the correction value calculated, wherein the correction part corrects the measurement result from the correction value stored.

4. An image measurement method, comprising:
acquiring a first captured image group by image-capturing an object with an image capturing part placed static at each of a plurality of image capturing positions;
acquiring a second captured image group by image-capturing the object with the image capturing part relatively moving so as to pass each of a plurality of the image capturing positions; and
calculating a correction value from the first and second captured image groups acquired.

5. The image measurement method according to claim 4, wherein
acquiring the first captured image group is executed to the object to be measured,
acquiring the second captured image group is executed to each of the object to be measured and a plurality of other objects to be measured in the same type; and
the image measurement method comprises correcting a measurement result of each of a plurality of the other objects to be measured based on the second captured image group from the correction value calculated to the object to be measure.

6. An information processing apparatus, comprising:
a movement control part that controls an image capturing position of an image capturing part that image captures an object; and
a calculation part that calculates a correction value from a first captured image group acquired by placing the image capturing part static at each of a plurality of image capturing positions and a second captured image group acquired by relatively moving the image capturing part so as to pass each of a plurality of the image capturing positions, the first captured image group and the second captured image group being captured image groups of images captured at a plurality of the predetermined image capturing positions by the image capturing part.

7. An information processing method executed by a computer, comprising:
acquiring a first captured image group by image-capturing an object with an image capturing part placed static at each of a plurality of image capturing positions;
acquiring a second captured image group by image-capturing the object with the image capturing part relatively moving so as to pass each of a plurality of the image capturing positions; and
calculating a correction value from the first and second captured image groups acquired.

8. A program causing a computer to execute a method, comprising:
acquiring a first captured image group by image-capturing an object with an image capturing part placed static at each of a plurality of image capturing positions;
acquiring a second captured image group by image-capturing the object with the image capturing part relatively moving so as to pass each of a plurality of the image capturing positions; and
calculating a correction value from the first and second captured image groups acquired.

* * * * *